May 19, 1959 E. E. SIVACEK 2,887,084
SPEEDOMETER
Filed Oct. 13, 1954 5 Sheets-Sheet 2

INVENTOR.
Emil E. Sivacek
BY
Harness, Dickey & Pierce
ATTORNEYS

United States Patent Office  2,887,084
Patented May 19, 1959

2,887,084

SPEEDOMETER

Emil E. Sivacek, Ann Arbor, Mich., assignor to King-Seeley Corporation, Ann Arbor, Mich., a corporation of Michigan Application October 13, 1954, Serial No. 462,006

3 Claims. (Cl. 116—57)

This invention relates to indicating or measuring devices and, more particularly, to an improved indicating device of the type in which the measured intelligence is indicated by the position of an angularly movable indicating member relative to a graduated scale.

In conventional indicating devices having angularly movable indicating members or pointers, the scale associated with the indicating member is graduated as a function of the angular movement of the indicating member relative to the scale. When a rectilinear scale is utilized with a substantially straight, pivotally mounted indicator, the graduations on the scale must be unequally spaced if the graduations are to reflect accurately equal increments of angular movement of the indicating member since the rectilinear motion of the indicating member relative to the scale is not proportional to the angular movement thereof. Accordingly, the graduations on a rectilinear scale are usually more closely spaced near the center of the scale and the distance between graduations increases toward the ends of the scale. Moreover, when a rectilinear scale is utilized, such a pivotally mounted indicating member intersects the scale at right angles at only one point, normally the midpoint of the scale, and intersects the remainder of the scale at oblique angles which vary with the angular movement of the indicating member.

Heretofore, indicating devices have been proposed which include a substantially rectilinear slot having a linear reference scale associated therewith, and a spiral pointer that is mounted for pivotal movement about an axis which intersects the longitudinal axis of the slot at substantially right angles, the movement of the pointer relative to the slot serving as an indication of the angular displacement of the pointer. However, these last-mentioned devices are subject to the defect that if a relatively long scale is desired, the spiral pointer must also be relatively long, with a resultant increase in the transverse dimensions of the device. In the alternative, the spiral pointer of such prior devices must rotate through more than one revolution when a relatively long scale is employed, with the result that the restoring forces on the pointer are reduced, since the restoring forces are inversely proportional to the angular displacement of the pointer. Furthermore, such prior devices are objectionable in that the sections of the spiral pointer which are visible through the slot intersect the longitudinal axis of the slot at oblique angles, rather than right angles, and the slot must be relatively narrow if the point of intersection of the spiral pointer with the longitudinal axis of the slot is to be read accurately against the linear scale.

An object of the invention is to overcome disadvantages in prior measuring devices and to provide an improved indicating device incorporating improved means for translating an angular motion to a rectilinear motion whereby the rectilinear motion is substantially proportional to the angular motion.

Another object of the invention is to provide an improved indicating device which incorporates improved means for translating the angular motion of an angularly movable indicating member to an associated rectilinear scale whereby the indicating member intersects the rectilinear scale at substantially right angles throughout any desired or predetermined range of movement of the indicating member relative to the scale.

Another object of the invention is to provide an improved indicating device incorporating improved means for translating an angular motion to a rectilinear motion to effect a ribbon-type indication which may be associated with a graduated scale.

Another object of the invention is to provide an improved indicating device incorporating improved means for translating an angular motion to a proportional rectilinear motion throughout one range of angular movement and translating an angular motion to a non-proportional rectilinear motion throughout another range of angular movement.

Another object of the invention is to provide an improved indicating device which is economical to manufacture and assemble, durable, efficient and reliable in operation, and which incorporates improved means for reducing and damping oscillations.

Still another object of the invention is to provide an improved indicating device that is pleasing in appearance, compact, readily discernible, and which may be installed with a minimum of labor and expense.

In the accomplishment of these objects, the present invention provides an indicating device which may include a rectilinear scale and an angularly movable indicating member having a curved portion adapted to intersect the associated scale at substantially right angles throughout any desired range of movement relative to the scale. The curved portion may be adapted to move relative to a rectilinear scale so that equally spaced distances between points at which the indicating member intersects the scale correspond to equal increments of angular movement of the indicating member. In addition, the present invention provides an indicating device wherein the angular movement and the mass of the indicating member are relatively small with the result that the ratio of the restoring force to the mass is relatively large, thereby reducing and damping oscillation of the indicating member. Furthermore, the present invention provides an indicating device having an angularly movable indicating member which may be readily adapted to produce a ribbon-type indication which may be associated with a graduated scale, and the indicating member may also be readily adapted to indicate accurately, on a linear scale, the angular movement of the indicating member over a predetermined range relative to the scale and to read high or low over the remainder of the scale.

The above as well as other objects and advantages of the present invention will become apparent from the following description, the appended claims and the accompanying drawings wherein:

Referring to the drawings, the present invention is shown incorporated in a speedometer for measuring the speed of an automotive vehicle, although it will be understood that the present invention is applicable to other types of indicating or measuring devices.

Referring more particularly to Figs. 1 through 4, a speedometer, generally designated 20, is shown, which is comprised of a dial plate 22 having an elongate, substantially straight slot 24 therein. A rectilinear scale 26 is provided adjacent the slot 24, the scale 26 including substantially equally spaced graduations 28 and suitable indicia 30 denoting uniform increments of speed. A mounting plate 32 is provided which is adapted to be secured to the dashboard 33 or other mounting panel on the vehicle by any suitable or conventional means, and the dial plate 22 is fixed to the mounting plate 32, in spaced relationship with respect thereto. A driving member 34 is provided which may be of any desired or conventional type as, for example, a conventional magnetic driving member, one end 36 of which is adapted to be drivably connected to a rotatable speedometer cable 37. The driving member 34 also includes a drive shaft 38 which, in this embodiment of the invention, projects through the mounting plate 32 so that the axis of the shaft 38 is spaced laterally outwardly from the longitudinal axis of the slot 24 and lies in a plane which is substantially perpendicular to the longitudinal axis of the slot 24, the plane preferably passing through one end portion of the slot 24 at a position substantially coinciding with the terminal or end graduation 40 of the scale 26. As will be understood by those skilled in the art, the angular movement of the drive shaft 38 is substantially directly proportional to the speed of the vehicle, and changes in the angular position of the drive shaft are substantially directly proportional to changes in the speed of the vehicle. For example, for each change in speed of ten miles per hour in the speed of the vehicle, the drive shaft 38 will move through substantially equal angular increments.

An indicating member 42 is provided which is disposed between the dial plate 22 and the mounting plate 32, the indicating member having a hub portion 44, a relatively narrow intermediate portion 46, and a relatively narrow curved portion 48. The hub portion 44 is fixed to the shaft 38 of the driving member 34 so that the angular position of the indicating member 42 is substantially directly proportional to the speed of the vehicle, and the angular movement of the indicating member 42 varies proportionately as the speed of the vehicle varies. The curved portion 48 of the indicating member 42 projects upwardly, as viewed in Figs. 1 through 4, and the curvature of the portion 48 is developed so that the portion 48 intersects a plane passing through the longitudinal axis of the slot 24 parallel to the axis of the shaft 38, at substantially right angles throughout the entire range of movement of the indicating member. With such a construction, the section of the curved portion of the indicating member that is visible through the slot 24 in the dial plate is substantially perpendicular to the longitudinal axis of the slot throughout the entire range of movement of the indicating member, while the remaining portion of the indicating member is concealed by the dial plate and the dashboard.

As previously mentioned, the graduations 28 of the scale 26 are substantially equally spaced and the indicia 30 denote uniform increments of speed. The curved portion 48 of the indicating member is also developed so that the portion thereof which is visible through the slot 24 moves through equal increments of the scale substantially directly proportional to the angular movement of the indicating member with the result that the true speed of the vehicle is indicated on the rectilinear scale throughout the entire range of angular movement of the indicating member.

The longitudinal axis of the drive shaft 38 is preferably displaced laterally from the longitudinal axis of the slot 24 by a distance such that the angular movement of the indicating member is less than 180° in the embodiments of the invention illustrated, such angular movement of the indicating member being less than 90°. Since the angular movement and the mass of the indicating member are relatively small and since the restoring forces on the indicating member are inversely proportional to the angular displacement, the ratio of the restoring forces to the mass is relatively large, thereby reducing and damping oscillation of the indicating member.

Figures 2, 5, 6:
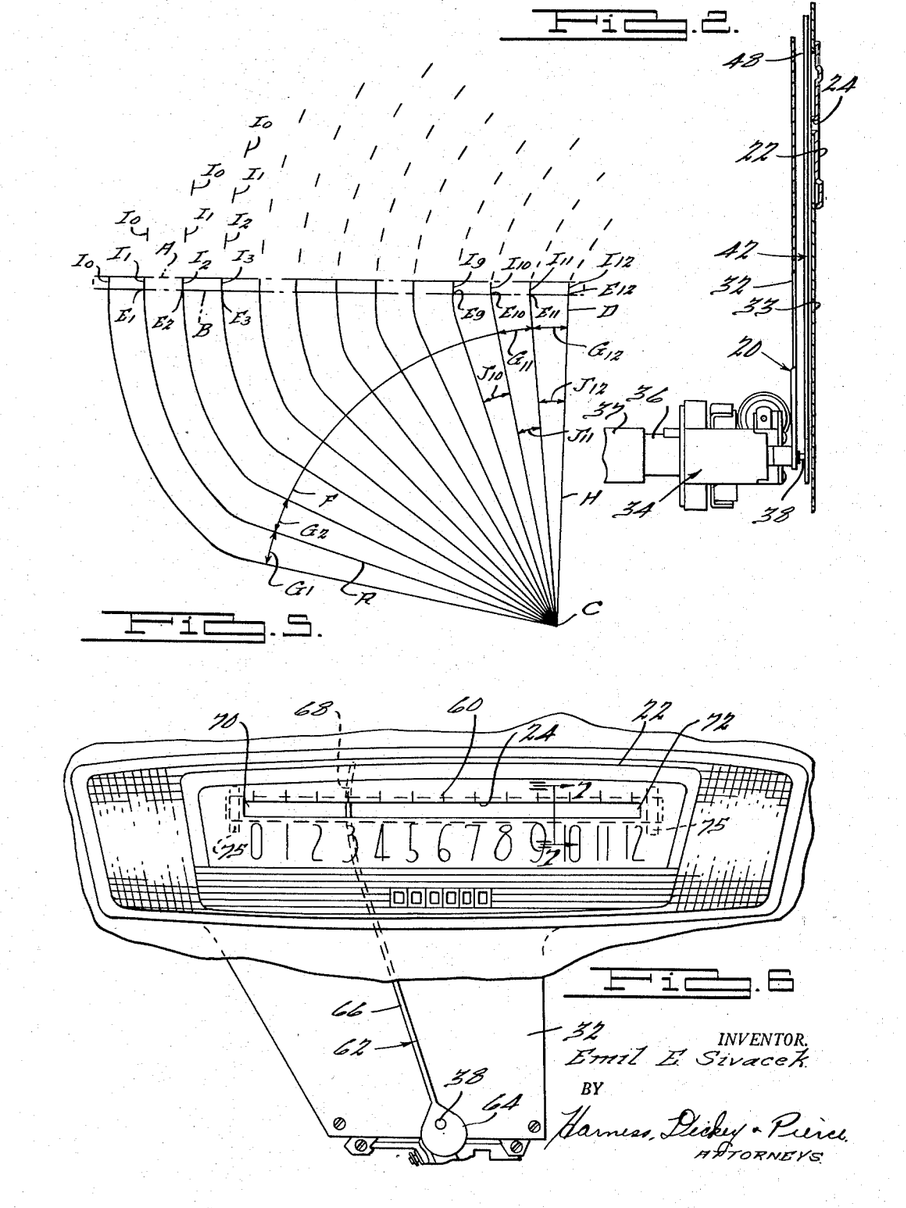
Fig. 2 is a sectional side elevational view of the structure illustrated in Fig. 1, taken on the line 2—2 thereof.
Fig. 5 is a graphical representation illustrating one manner by which the curvature of the indicating member may be developed.
Fig. 6 is a front elevational view of another embodiment of the invention.

One method of developing the curvature of the portion 48 of the indicating member is shown in Fig. 5. A pair of spaced parallel lines A and B are drawn, for example, on a first sheet of paper, the length of the lines A and B corresponding to the desired length of the scale 26 of the indicating device and the lines A and B being spaced apart a distance corresponding to the desired width of the slot 24. The lines A and B are then graduated by points $E_1, E_2 \ldots E_{12}$ which are spaced apart a distance equal to the distance between graduations on the scale 26. A center C is selected which lies on a line D perpendicular to the lines A and B, the line D preferably being drawn through a point $E_{12}$ corresponding to the terminal or end graduation 40 on the scale 26. A radius R is selected which may be of any desired length but which is preferably greater than the length of the scale 26 divided by $2\pi$, although it will be understood that such limitation is not essential to the present invention. An arc F having the center C and the radius R is then struck and the arc is divided into segments $G_1$ and $G_2 \ldots G_{12}$, the chordal lengths of which are substantially equal to the distance between the graduations 28 on the scale 26, and the number of segments corresponding to the number of graduated increments on the scale 26 between the ends thereof. A second sheet of relatively transparent material is then superimposed on the first sheet and a line H is drawn on the second sheet, the line H being superimposed on the line D on the first sheet and being drawn from the point C to the point $E_{12}$ on the first sheet. A line $I_{12}$ is then drawn between the lines A and B through the point $E_{12}$ in a direction perpendicular to the lines A and B. The ends of the line $I_{12}$ terminate adjacent the lines A and B, and one end of the line $I_1$ is connected to the adjacent end of the line H. The line H is then rotated through an angle $J_{12}$ which subtends the segment $G_{12}$ while maintaining one end of the line H on the point C and the other end of the line on the arc F, the angle $J_{12}$ corresponding to the angular movement through which the shaft 38 moves during one increment of speed change, as, for example, from 120 m.p.h. to 110 m.p.h. A line $I_{11}$ is then drawn through the point $E_{11}$ and between the lines A and B in a direction perpendicular to the lines A and B, the ends of the line $I_{11}$ terminating adjacent the lines A and B. The line H is then successively rotated through successive angles $J_{10}, J_9 \ldots J_1$, such angles subtending the segments $G_{10}, G_9 \ldots G_1$ and corresponding to the angular rotation of the shaft 38 in response to equal increments of speed change, and lines $I_{10}, I_9 \ldots I_1$ are drawn through the points $E_{10}, E_9 \ldots E_1$ and between the lines A and B each time the line H is successively rotated. Thereafter, the lines $I_{12}, I_{11} \ldots I_1$ are connected by a smooth curve, and it will be apparent that when the portion 48 of the indicating member conforms to such a developed curve, the portion 48 will intersect the longitudinal axis of the slot 24 at substantially right angles throughout the entire range of angular movement of the indicating member relative to the slot when the indicating member is rotated about an axis, the position of which corresponds with the center C. Furthermore, the rectilinear motion of the developed curve along the slot 24 will be substantially directly proportional to the angular movement of the indicating member with the result that the true speed of the vehicle will be indicated on the scale 26 throughout the entire range of movement of the indicating member.

Figures 1, 3, 4:
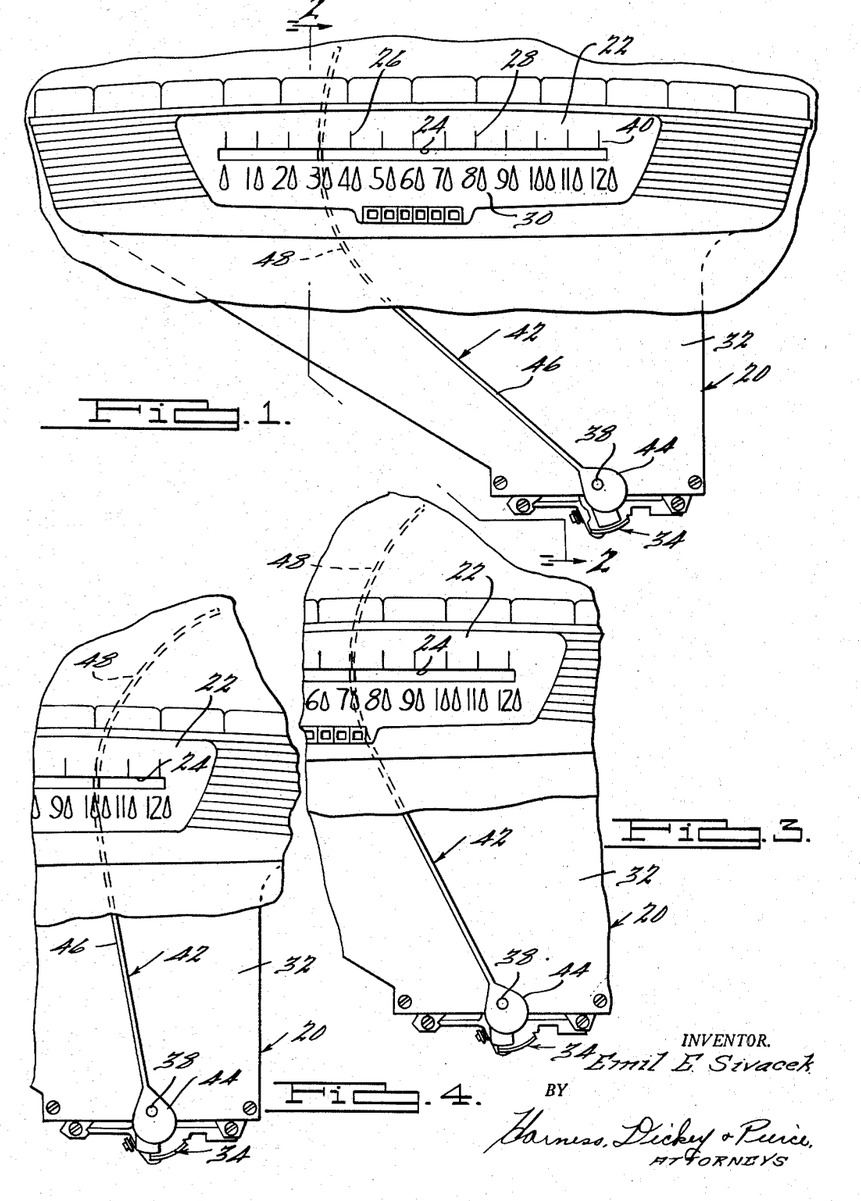
Figure 1 is a front elevational view of an indicating device embodying the present invention.
Fig. 3 is a fragmentary front elevational view of the structure illustrated in Fig. 1, and showing the indicating member in another operative position.
Fig. 4 is a fragmentary front elevational view of the structure illustrated in Fig. 1, and showing the indicating member in still another operative position.

In the operation of this embodiment of the invention, assuming that the vehicle is traveling 30 miles per hour, the shaft 38 will rotate through an angle substantially directly proportional to the speed of the vehicle and such angular movement will be imparted to the indicating member 42 with the result that the hub portion 44 of the indicating member will rotate through the same angular increment. The curved portion 48 of the indicating member will then move longitudinally relative to the scale 26 through a rectilinear increment substantially proportional to the angular increment and will intersect the longitudinal axis of the slot 24 at substantially right angles, thereby indicating that the vehicle is traveling 30 miles per hour. As the speed of the vehicle varies, the angular movement of the indicating member will vary substantially directly proportionately to the speed of the vehicle and the curved portion 48 will move through equal increments on the scale 26 corresponding to equal changes in speed. As shown in Fig. 3, the indicating member 46 will intersect the longitudinal axis of the slot 24 at substantially right angles when the vehicle reaches 70 miles per hour, and, as shown in Fig. 4, such curved portion will intersect the longitudinal axis of the slot 24 at substantially right angles when the vehicle reaches a speed of 100 miles per hour, the true speed of the vehicle being indicated throughout the entire range of movement of the indicating member.

Another embodiment of the invention is illustrated in Figs. 6 through 9, this embodiment of the invention being particularly adapted to indicate the true speed of the vehicle over a predetermined range of the speedometer scale and to indicate a speed higher than the actual speed of the vehicle throughout the remaining range of the scale. In this embodiment of the invention, the driving member 34 is mounted on the mounting plate 32 so that the driveshaft 38 projects through the mounting plate in laterally outwardly spaced relationship with respect to the longitudinal axis of the slot 24 in the dial plate 22, and the longitudinal axis of the shaft 38 lies in a plane which is substantially perpendicular to the longitudinal axis of the slot 24 and intersects the slot intermediate the ends thereof, preferably at a position coinciding with the graduation 60 with which it is desired to separate the true speed range of the scale from the high reading range of the scale. In this embodiment of the invention an indicating member 62 is provided which is disposed between the dial plate 22 and the mounting plate 32 and which rotates in a plane which is substantially parallel to the planes of the dial plate 22 and the mounting plate 32. The indicating member 62 includes a hub portion 64, a relatively narrow intermediate portion 66 and a relatively narrow curved portion 68, the hub portion 64 being fixed to the driveshaft 38 of the driving member 34 so that the angular position of the indicating member and the angular movement of the indicating member are substantially directly proportional to the speed and the changes in the speed, respectively, of the vehicle. In this embodiment of the invention, the curved portion 68 of the indicating member projects upwardly, as viewed in Fig. 6, and the curvature of the portion 68 is developed so that such portion intersects a plane passing through the longitudinal axis of the slot 24 parallel to the axis of the driveshaft 30 at substantially right angles, from the end 70 of the scale 26 to a position coinciding with the graduation 60 on the scale and intersects such plane at oblique angles from a point adjacent the graduation 60 to the end 72 of the scale. With such a construction, the sections of the curved portion 68 that are visible through the slot 24 as the indicating member 62 moves along the scale are substantially perpendicular to the longitudinal axis of the slot 24 throughout the range of movement from the end 70 of the scale to the graduation 60 on the scale and are inclined to the longitudinal axis of the slot through the range of movement from the graduation 60 on the scale to the end 72 thereof. Furthermore, the midpoints of the sections of the curved portion 68 visible through the slot 24 in the range of movement from the graduation 60 to the end 72 of the scale are offset slightly to the right, as viewed in Fig. 6, with respect to the graduations in such range. Thus, the true speed of the vehicle is indicated on the scale in the range from the end 70 of the scale to the graduation 60 and a speed higher than the true speed is indicated in the range from the graduation 60 to the end 72 of the scale.

In order that the sections of the curved portion 68 that are visible through the slot 24 will appear to be substantially perpendicular to the scale throughout the entire range of movement of the indicating member, a rod-like lens 74 is provided which is disposed between the indicating member 62 and the slot 24 so that the indicating member is adjacent the focal point of the lens, the lens being retained by brackets 75 fixed to the dial plate 22. The diameter of the rod-like lens 74 is preferably greater than the width of the slot 24 so that the portions of the dial plate 22 adjacent the slot conceal the upper and lower edges of the lens, as viewed in Fig. 7. With such a construction, the image of the curved portion 68 of the indicating member will appear to be perpendicular to the longitudinal axis of the slot throughout the entire range of movement of the indicating member when viewed through the slot and the lens, even though the curved portion of the indicating member is actually inclined to the longitudinal axis of the slot in the range from the graduation 60 to the end 72 of the scale. Furthermore, the indicating member 62 will indicate the true speed of the vehicle on the scale in the range from the end 70 of the scale to the graduation 60 and will indicate a speed higher than the true speed in the range from the graduation 60 to the end 72 of the scale. It will be apparent that the spacing between the graduations in the high reading range of the scale may be altered slightly to increase the differential between the true speed and the indicated speed while maintaining the effect of an evenly graduated scale.

The curvature of the curved portion 68 of the indicating member 62 may be developed in the manner previously described, the center C being located at a position coinciding with the desired position of the axis of rotation of the drive shaft 38 relative to the slot 24, and the arc F being divided into equal segments, the chordal lengths of which are proportional to the distances between the graduations 28 on the scale 26 in the range from the end 70 thereof to the graduation 60.

Figures 7, 8, 9:
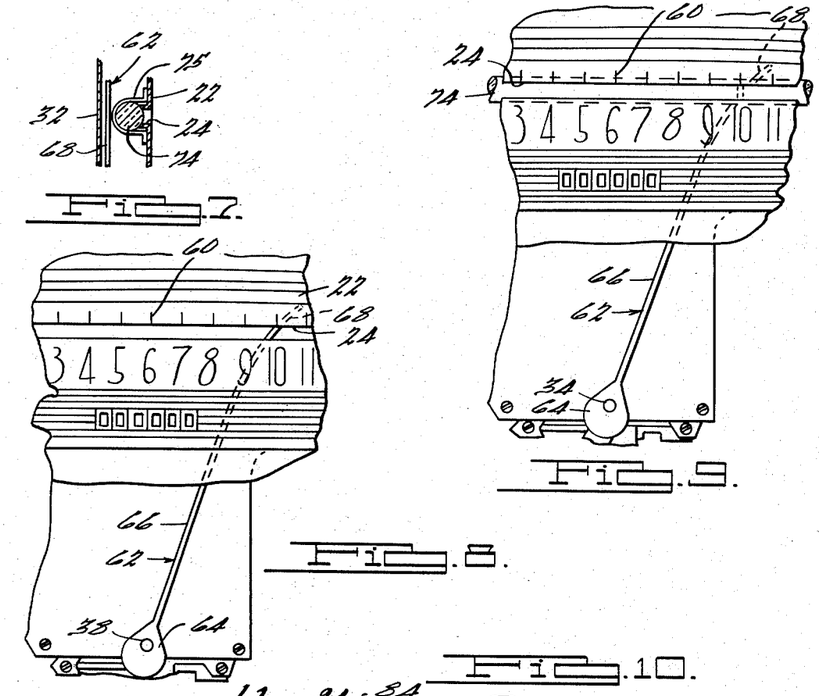
Fig. 7 is a sectional side elevational view of a portion of the structure illustrated in Fig. 6, taken on the line 7—7 thereof.
Fig. 8 is a fragmentary front elevational view of a portion of the structure illustrated in Fig. 6, showing the indicating member in another operative position and the lens removed therefrom.
Fig. 9 is a fragmentary front elevational view of a portion of the structure illustrated in Fig. 6, showing the indicating member in the operative position illustrated in Fig. 8 and the lens in the installed position.

In the operation of this embodiment of the invention, assuming that the vehicle is traveling 30 miles per hour, the driveshaft 38 will rotate through an angle substantially directly proportional to the speed of the vehicle, and such angular movement will be imparted to the indicating member 62. The curved portion 68 of the indicating member 62 will then move longitudinally of the scale 26 through a rectilinear increment substantially proportional to the angular increment of motion, and will intersect the longitudinal axis of the slot 24 at substantially right angles adjacent the indicia 30 denoting that the vehicle is traveling 30 miles per hour. As the speed of the vehicle varies, the angular movement of the indicating member 62 will vary substantially directly proportionally to the speed of the vehicle and the curved portion 68 will move through equal rectilinear increments on the scale in the range from the end 70 to the graduation 60 thereon, such increments corresponding to equal changes in speed of the vehicle. As shown in Fig. 8, the curved portion 68 of the indicating member will be inclined to the longitudinal axis of the slot, and the point of intersection with the longitudinal axis of the slot will be slightly displaced from the graduations on the scale which correspond to equal increments of speed change in the range from the graduation 60 to the end 72 of the scale. However, as shown in Fig. 9, when the indicating member 62 is viewed through the slot 24 and the lens 74, the image of the indicating member will appear to be substantially perpendicular to the longitudinal axis of the slot 24 throughout the entire range of movement of the indicating member in both the true speed range and the high reading range.

Another embodiment of the invention is illustrated in Figs. 10 through 13, this embodiment of the invention being adapted to produce a ribbon-type speed indication in association with a rectilinear scale; to indicate the true speed of the vehicle over a predetermined range of the speedometer scale; and to indicate a speed higher than the actual speed of the vehicle throughout the remaining range of the scale. In this embodiment of the invention, the driving member 34 is mounted on the mounting plate 32 so that the driveshaft 38 projects through the mounting plate in outwardly spaced relationship with respect to the longitudinal axis of the slot 24 and the longitudinal axis of the shaft 38 lies in a plane which is substantially perpendicular to the longitudinal axis of the slot 24 and intersects the slot 24 intermediate the ends thereof, preferably at a position coinciding with the graduation 60 with which it is desired to separate the true speed range of the scale from the higher reading range of the scale.

In this embodiment of the invention a plate-like indicating member 80 is provided which is shaped generally in the form of a quadrant of a circle, and which is disposed between the dial plate 22 and the mounting plate 32. The hub portion 82 of the indicating member 80 is fixed to the drive shaft 38 of the driving member 34 so that the angular position and the angular movement of the indicating member are substantially directly proportional to the speed and the changes in speed, respectively, of the vehicle.

Figure 10:
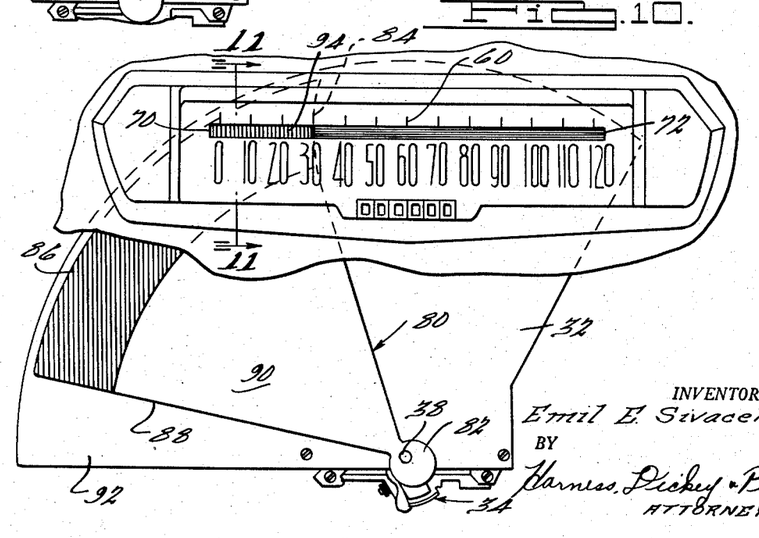
Fig. 10 is a front elevational view of another embodiment of the invention.

In this embodiment of the invention the radially outer portion of the leading edge 84 of the indicating member 80 is curved and projects upwardly, as viewed in Fig. 10. The curvature of the radially outer portion of the leading edge 84 is developed so that such curved portion of the leading edge intersects a plane passing through the longitudinal axis of the slot parallel to the axis of rotation of the driveshaft at substantially right angles from the end 70 of the scale 26 to a position coinciding with the graduation 60 on the scale and intersects such plane at oblique angles from the graduation 60 to the end 72 of the scale. The plate-like indicating member 80 is of such a size that the edge 86 and the trailing edge 88 thereof are not visible through the slot 24 througout the entire range of movement of the indicating member 80, and the surface 90 of the indicating member 80 is colored, as for example red, or otherwise marked so as to contrast with the dial plate and the surface 92 of the mounting plate. With such a construction, the sections of the curved portion of the leading edge 84 that are visible through the slot 24 as the indicating member moves relative to the scale 26 are substantially perpendicular to the longitudinal axis of the slot 24 through the range of movement from the end 70 of the scale to the graduation 60 on the scale and are inclined to the longitudinal axis of the slot through the range of movement from the graduation 60 on the scale to the end 72 thereof. In addition, the portions of the surface 90 of the indicating member which are visible through the slot 24 as the leading edge moves relative to the scale provide a ribbon-like indication 94 which moves rectilinearly of the scale in proportion to the speed of the vehicle. Furthermore, the midpoints of the sections of the curved portion of the leading edge 84 which are visible through the slot in the range of movement of the indicating member from the point to the end of the scale are offset slightly to the right, as viewed in Fig. 10, with respect to the graduations in such range denoting equal increments of speed change, with the result that the true speed of the vehicle is denoted by the length of the ribbon-type indication in the range from the end 70 of the scale to the graduation 60 and a speed higher than the true speed is denoted by the length of the ribbon-type indication in the range from the graduation 60 to the end 72 of the scale.

In order that the sections of the curved portion of the leading edge 84 of the indicating member that are visible through the slot will appear to be substantially perpendicular to the scale throughout the entire range of movement of the indicating member, a rod-like lens may be provided between the indicating member 80 and the slot 24 in the manner previously described for the purpose of erecting the image of the leading edge so that the leading edge will appear to be perpendicular to the longitudinal axis of the slot throughout the entire range of movement of the indicating member when viewed through the slot and the lens. The curvature of the leading edge of the indicating member may be developed in the manner previously described in connection with the embodiment illustrated in Fig. 6.

Figures 11, 12:
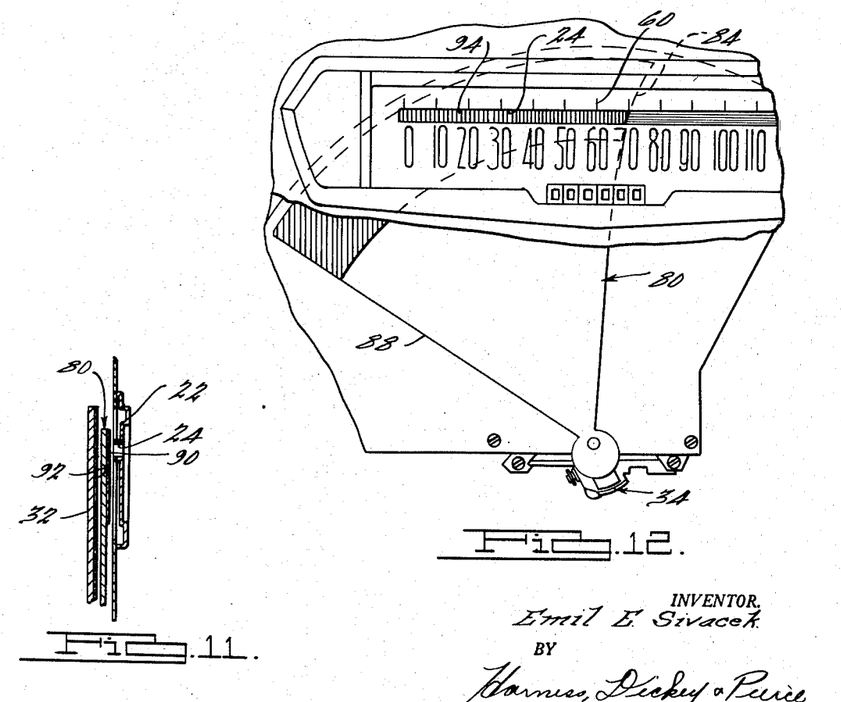
Fig. 11 is a sectional side elevational view of a portion of the structure illustrated in Fig. 10, taken on the line 11—11 thereof.
Fig. 12 is a fragmentary front elevational view of a portion of the structure illustrated in Fig. 10, and showing the indicating member in another operative position.
Figure 13:
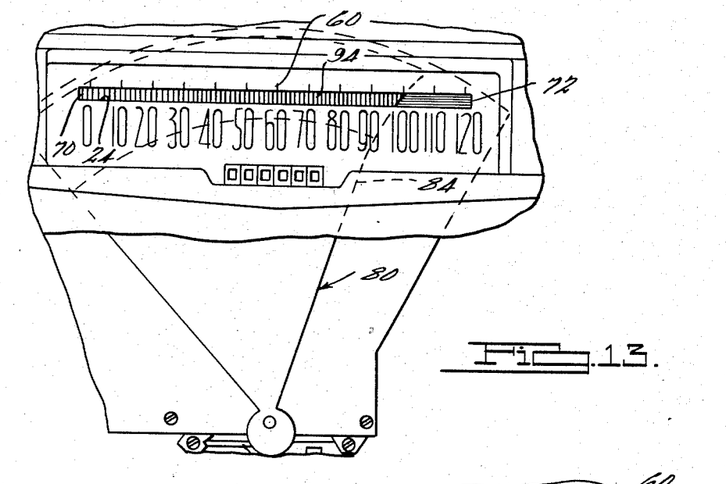
Fig. 13 is a fragmentary front elevational view of a portion of the structure illustrated in Fig. 10, and showing the indicating member in another operative position.

In the operation of this embodiment of the invention, assuming that the vehicle is traveling 30 miles per hour, the shaft 38 will rotate through an angle substantially directly proportional to the speed of the vehicle and such angular movement will be imparted to the indicating member 80. The leading edge 84 of the indicating member will then move longitudinally of the slot through a rectilinear increment substantially directly proportional to the angular increment of motion, and the curved portion of the leading edge will intersect the longitudinal axis of the slot at substantially right angles. At the same time, the surface 90 of the indicating member which is visible through the slot 24 will provide the ribbon-like indication 94, the length of which, when associated with the scale, denotes that the vehicle is traveling 30 miles per hour. As the speed of the vehicle varies, the angular movement of the indicating member and the length of the ribbon-type indication 94 will vary substantially directly proportionally to the speed of the vehicle and the curved portion of the leading edge 84 of the indicating member 80 will move through equal increments on the scale in the range from the end 70 to the graduation 60 thereon, such increments corresponding to equal changes in speed. As shown in Figs. 12 and 13, the curved portion of the leading edge 84 visible through the slot 24 will be inclined to the longitudinal axis of the slot 24 and the midpoints of such visible portions will be slightly displaced from the graduations on the scale denoting equal changes of speed for equal increments of angular motion of the indicating member 80 in the range from the graduation 60 to the end 72 of the scale with the result that a speed higher than the actual speed will be denoted by the length of the ribbon relative to the scale. As previously mentioned, the leading edge may be erected by the use of a rod-like lens so that the image of the leading edge of the indicating member appears to be substantially perpendicular to the longitudinal axis of the slot throughout the entire range of angular movement of the indicating member.

Another embodiment of the invention is illustrated in Figs. 14 through 17, this embodiment of the invention being adapted to produce a ribbon-type indication associatable with the rectilinear scale and to indicate the true speed of the vehicle throughout the entire range of movement of the indicating member relative to the scale. In this embodiment of the invention, the driving member 34 is mounted on the mounting plate in the manner illustrated in Fig. 1 so that the driveshaft 38 projects through the mounting plate in outwardly spaced relationship with respect to the longitudinal axis of the slot, and the axis of rotation of the shaft 38 lies in a plane which is substantially perpendicular to the longitudinal axis of the slot 24 and intersects the slot at a position adjacent one end thereof, preferably at a position coinciding with the terminal graduation 40 of the scale 26. In this embodiment of the invention, a plate-like indicating member 100 is provided which is shaped generally in the form of a quadrant of a circle and which is disposed between the dial plate 22 and the mounting plate 32. The hub portion 102 of the indicating member 100 is fixed to the driveshaft 38 of the driving member 34 so that the indicating member rotates in a plane substantially parallel to the planes of the dial plate and the mounting plate. The angular position which the indicating member 100 assumes and the angular movement of the indicating member are thus substantially directly proportional to the speed and the changes in speed, respectively, of the vehicle.

Figures 14, 15, 16, 17:
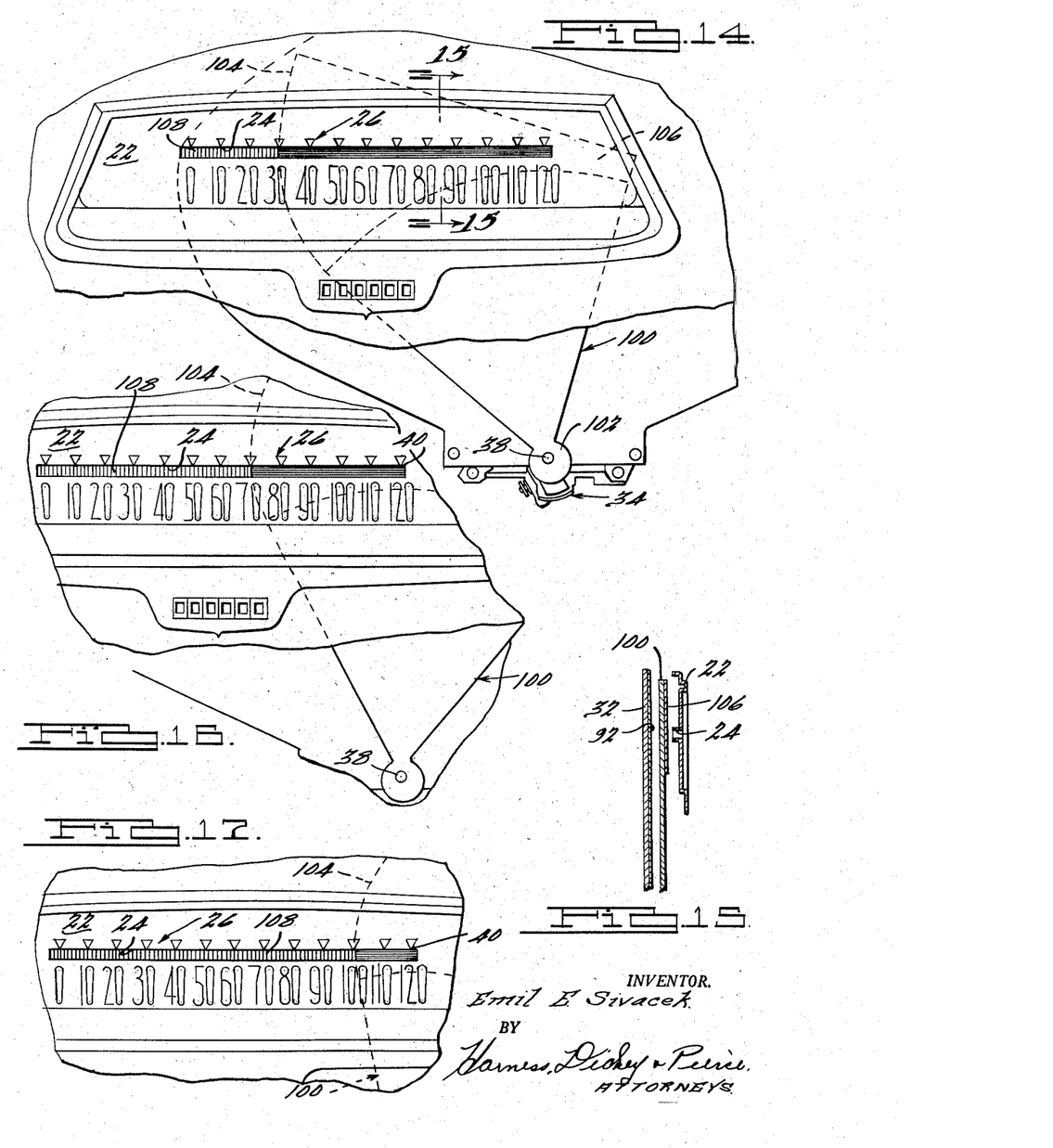
Fig. 14 is a front elevational view of another embodiment of the invention.
Fig. 15 is a sectional side elevational view of a portion of the structure illustrated in Fig. 12, taken on the line 15—15 thereof.
Fig. 16 is a fragmentary front elevational view of a portion of the structure illustrated in Fig. 14, and showing the indicating member in another operative position.
Fig. 17 is a fragmentary front elevational view of the structure illustrated in Fig. 14, and showing the indicating member in another operative position.

In this embodiment of the invention, the radially outer end portion of the trailing edge 104 of the indicating member 100 is curved and projects upwardly, as viewed in Fig. 14, while the surface 106 of the indicating member initially covers the entire area of the slot 24. The curvature of the outer end portion of the trailing edge 104 is developed in the manner shown in Fig. 5, so that the curved portion of the trailing edge intersects a plane passing through the longitudinal axis of the slot 24 parallel to the axis of the driveshaft, at substantially right angles throughout the entire range of movement of the trailing edge relative to the slot 24. As the indicating member 100 moves relative to the slot 24, the indicating member 100 is adapted to uncover the surface 92 of the mounting plate, which surface 92 may be given a color contrasting with the color of the surface 106 of the indicating member. With such a construction, the sections of the curved portion of the trailing edge 104 of the indicating member that are visible through the slot 24 as the indicating member moves along the scale 26 are substantially perpendicular to the longitudinal axis of the slot throughout the entire range of movement of the indicating member 100 relative to the scale. In addition, the portions of the surface 92 of the mounting plate which are uncovered by the indicating member 100 and which become visible through the slot 24 provide a ribbon-type indication 108, the length of which is substantially directly proportional to the speed of the vehicle throughout the entire range of movement of the indicating member. The surface 92 of the mounting plate may be lighted by any suitable or desired means, as, for example, by a suitable lamp (not shown), the filaments of which are connected to the source of potential of the vehicle.

In the operation of this embodiment of the invention, assuming that the vehicle is traveling 30 miles per hour, the shaft 38 will rotate through an angle substantially directly proportional to the speed of the vehicle and such angular movement will be imparted to the indicating member 100. The curved portion of the trailing edge 104 will then move longitudinally through a rectilinear increment substantially directly proportional to the angular increment of motion and will intersect the longitudinal axis of the slot at substantially right angles. At the same time the surface 92 of the mounting plate which is uncovered by the indicating member 100 will become visible through the slot, thereby providing the ribbon-type indication 108, the length of which, when associated with the scale 26, denotes that the vehicle is traveling 30 miles per hour. As the speed of the vehicle varies, the angular movement of the indicating member will vary substantially directly proportionally to the speed of the vehicle and the curved portion of the trailing edge 104 will move through equal rectilinear increments thereby uncovering additional portions of the surface 92 of the mounting plate 32, which, when viewed through the slot 24, provide the ribbon-type indication, equally varying lengths of which correspond to equal changes in speed. As shown in Figs. 16 and 17, the curved portion of the trailing edge 104 of the indicating member will intersect the longitudinal axis of the slot 24 at substantially right angles throughout the entire range of movement of the indicating member so that the end on the ribbon-type indication which is defined by the curved portion of the trailing edge 104 will be maintained substantially perpendicular to the longitudinal axis of the slot throughout the entire range of movement of the indicating member.

While preferred embodiments of the invention have been shown and described, it will be understood that various changes and modifications may be made without departing from the spirit of the invention.

What is claimed is:

1. In an indicating device, the combination comprising a substantially rectilinear scale having substantially equally spaced graduations thereon, an indicating member operatively associated with said scale and mounted for angular movement about a fixed axis spaced transversely of said scale, an edge portion of said indicating member having a plurality of spaced substantially straight sections of variable slope adapted to intersect said scale in response to angular movement of said indicating member about said axis, the slope of said straight sections being such that said straight sections intersect said scale in equally spaced increments substantially proportional to equal angular increments of motion of said indicating member about said axis.

2. In an indicating device, the combination comprising a substantially rectilinear scale having substantially equally spaced graduations thereon, an indicating member operatively associated with said scale and mounted for angular movement about a fixed axis spaced transversely of said scale, an edge portion of said indicating member having a plurality of spaced substantially straight sections of variable slope adapted to intersect successively said scale in response to angular movement of said indicating member about said axis, the slope of said straight sections being such that said straight sections intersect said scale at substantially right angles and in equally spaced increments substantially proportional to equal angular increments of motion of said indicating member about said axis.

3. In a speedometer the combination comprising a rectilinear scale having equally spaced graduations thereon, an indicating member operatively associated with said scale and mounted for angular movement about a fixed axis spaced transversely of said scale, said indicating member having an edge portion curved in the direction of the length of said member and adapted to intersect said scale throughout the entire range of movement of said indicating member relative to said scale, the curvature of said edge portion being developed whereby said edge portion intersects said scale at right angles and in equal rectilinear increments proportional to equal angular increments of motion of said indicating member about said axis throughout the entire range of movement of said indicating member relative to said scale.

References Cited in the file of this patent

UNITED STATES PATENTS

| | | |
|---|---|---|
| 1,361,697 | Dugit | Dec. 7, 1920 |
| 1,757,949 | Schlaich | May 6, 1930 |
| 1,761,947 | Wedin | June 3, 1930 |
| 2,062,461 | Le Fevre | Dec. 1, 1936 |
| 2,411,597 | Smith | Nov. 26, 1946 |
| 2,628,442 | Blewett | Feb. 17, 1953 |

FOREIGN PATENTS

| | | |
|---|---|---|
| 540,294 | Great Britain | Oct. 13, 1941 |